US012746961B2

(12) United States Patent
Xia et al.

(10) Patent No.: US 12,746,961 B2
(45) Date of Patent: Sep. 29, 2026

(54) TRANSFER DEVICE

(71) Applicant: CONTEMPORARY AMPEREX TECHNOLOGY (HONG KONG) LIMITED, Hong Kong (CN)

(72) Inventors: Yijun Xia, Ningde (CN); Yanlin Sun, Ningde (CN); Chenqin Yu, Ningde (CN); Dawei Ni, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 296 days.

(21) Appl. No.: 18/427,357

(22) Filed: Jan. 30, 2024

(65) Prior Publication Data

US 2024/0253679 A1 Aug. 1, 2024

Related U.S. Application Data

(63) Continuation of application No. PCT/CN2023/096539, filed on May 26, 2023.

(30) Foreign Application Priority Data

Jan. 28, 2023 (CN) ......................... 202320153750.7

(51) Int. Cl.
*B62B 3/02* (2006.01)
*B62B 3/04* (2006.01)
(Continued)

(52) U.S. Cl.
CPC .................. *B62B 3/02* (2013.01); *B62B 3/04* (2013.01); *B62B 5/0033* (2013.01);
(Continued)

(58) Field of Classification Search
CPC ........................................................ B62B 3/02
See application file for complete search history.

(56) References Cited

U.S. PATENT DOCUMENTS 5,879,014 A * 3/1999 Price .......................... B62B 3/04 280/47.35
2011/0031259 A1* 2/2011 Megens .................... B62B 3/18 220/666

(Continued)

FOREIGN PATENT DOCUMENTS

CN 203185034 U 9/2013
CN 107323990 A 11/2017

(Continued)

OTHER PUBLICATIONS

The European Patent Office (EPO) The Extended European Search Report for Application No. 23828662.9 Nov. 29, 2024 8 Pages.

(Continued)

*Primary Examiner* — Erez Gurari
(74) *Attorney, Agent, or Firm* — ANOVA LAW GROUP, PLLC

(57) ABSTRACT

A transfer device includes an automated guided vehicle, a positioning platform, and a positioning transmission mechanism. The automated guided vehicle is provided with a supporting frame; the positioning platform is arranged on the supporting frame. The positioning transmission mechanism includes a first locking assembly, a second locking assembly, and a first driving assembly connected to the first locking assembly and the second locking assembly. The first locking assembly and the second locking assembly are arranged on two opposite sides of the positioning platform at an interval in a first direction in a horizontal plane. The first driving assembly is configured to drive the first locking assembly and the second locking assembly to move toward or away from each other, such that the first locking assembly and the second locking assembly cooperate to fix a piece-to-be-transferred.

18 Claims, 2 Drawing Sheets

(51) Int. Cl.
*B62B 5/00* (2006.01)
*B62B 5/06* (2006.01)

(52) U.S. Cl.
CPC .......... *B62B 5/0066* (2013.01); *B62B 5/0069* (2013.01); *B62B 5/0083* (2013.01); *B62B 5/06* (2013.01)

(56) References Cited

U.S. PATENT DOCUMENTS

| | | | | |
|---|---|---|---|---|
| 2020/0130719 | A1* | 4/2020 | Saeli | B62B 3/02 |
| 2023/0347955 | A1* | 11/2023 | Foster | B62B 5/00 |
| 2025/0026391 | A1* | 1/2025 | Kimura | B62B 5/0495 |

FOREIGN PATENT DOCUMENTS

| | | | |
|---|---|---|---|
| CN | 110937390 | A | 3/2020 |
| CN | 211107141 | U | 7/2020 |
| CN | 111959370 | A | 11/2020 |
| CN | 112794072 | A | 5/2021 |
| CN | 214420584 | U | 10/2021 |
| CN | 113581324 | A | 11/2021 |

OTHER PUBLICATIONS

The World Intellectual Property Organization (WIPO) International Search Report for PCT/CN2023/096539 Aug. 3, 2023 6 pages (including English translation).

* cited by examiner

TRANSFER DEVICE

CROSS-REFERENCE TO RELATED APPLICATIONS

The present application is a continuation of International Application No. PCT/CN2023/096539, filed on May 26, 2023, which claims priority to Chinese patent application no. 202320153750.7, filed on Jan. 28, 2023 and entitled "TRANSFER DEVICE", the entire contents of which are incorporated herein by reference.

TECHNICAL FIELD

The present application relates to the technical field of transfer apparatuses, and particularly relates to a transfer device.

BACKGROUND ART

This part provides merely background information related to the present disclosure, which is not necessarily the prior art.

At present, a semi-automatic apparatus is mainly used on a battery production line to process, assemble, transmit and detect batteries. In the related art, on the battery production line, battery components in a previous procedure are transferred to a next procedure by a transfer device and then are assembled. However, as each transfer device is only suitable for battery components with the same specifications and dimensions and cannot automatically adapt to products of different sizes, it is required to manually change the transfer device for changeover of products, resulting in low production efficiency.

SUMMARY

An objective of the present application is to provide a transfer device, which is configured to automatically adapt to pieces-to-be-transferred having different specifications and sizes, and is conducive to improvement in production efficiency during changeover.

The present application provides a transfer device. The transfer device includes: an automated guided vehicle, which is provided with a supporting frame; a positioning platform, which is arranged on the supporting frame; and a positioning transmission mechanism, which includes a first locking assembly, a second locking assembly, and a first driving assembly connected to the first locking assembly and the second locking assembly, where the first locking assembly and the second locking assembly are arranged on two opposite sides of the positioning platform at an interval in a first direction in a horizontal plane, and the first driving assembly is configured to drive the first locking assembly and the second locking assembly to move toward or away from each other, such that the first locking assembly and the second locking assembly cooperate to fix a piece-to-be-transferred.

According to the transfer device provided in the present application, the automated guided vehicle may drive the positioning transmission mechanism to move along a preset route, and may carry the piece-to-be-transferred according to production and assembly procedures, which is conducive to reduction in labor cost, and improvement in assembly efficiency of a product. The first locking assembly and the second locking assembly may cooperate to fix the piece-to-be-transferred, and the first driving assembly drives the first locking assembly and the second locking assembly to move toward or away from each other, such that by adjusting a distance between the first locking assembly and the second locking assembly, space between the first locking assembly and the second locking assembly may be compatible with pieces-to-be-transferred having different specifications and sizes, and the transfer device is not required to be changed during changeover. Therefore, production efficiency during changeover is effectively improved, and the transfer device is conducive to reduction in labor costs and production costs.

In addition, the transfer device provided in the present application can further have additional technical features as follows:

In some implementations of the present application, the first driving assembly includes: a first driving member; and a first transmission assembly, which is connected to the first driving member and is connected to the first locking assembly and the second locking assembly, respectively, where the first driving member is configured to drive the first transmission assembly to move, so as to drive the first locking assembly and the second locking assembly to move toward or away from each other.

In the implementation, the first driving assembly includes the first driving member, and the first transmission member, which is connected to the first driving member, and the first transmission member is connected to the first locking assembly and the second locking assembly. In this way, when the first driving member drives the first transmission member to execute an action, the first locking assembly and the second locking assembly may be driven to move toward or away from each other, so as to fix pieces-to-be-transferred having different specifications and sizes in a compatible manner.

In some implementations of the present application, the first transmission assembly includes: a first lead screw, which is connected to the first driving member, where the first lead screw extends in the first direction, two ends of the first lead screw are provided with a first thread and a second thread, respectively, and the first thread and the second thread are arranged in opposite directions; and a first spiral transmission member and a second spiral transmission member, where the first spiral transmission member is in threaded connection to the first thread, the second spiral transmission member is in threaded connection to the second thread, the first spiral transmission member is connected to the first locking assembly, the second spiral transmission member is connected to the second locking assembly, and when the first lead screw rotates, the first spiral transmission member and the second spiral transmission member are adapted to move toward or away from each other along the first lead screw.

In the implementation, the first spiral transmission member and the second spiral transmission member are in threaded connection to the first thread and the second thread, respectively, such that the first spiral transmission member, the second spiral transmission member and the first lead screw form the ball screw structure. Since the first thread and the second thread are arranged in opposite directions, when the first lead screw is driven by the first driving member to rotate, the first spiral transmission member and the second spiral transmission member may move toward or away from each other along the first lead screw, so as to drive the first locking assembly and the second locking assembly to move toward or away from each other. Therefore, the distance between the first locking assembly and the second locking assembly may be adjusted, so as to be compatible with pieces-to-be-transferred having different specifications and sizes.

In some implementations of the present application, the first locking assembly includes: a first slide rail and a second slide rail, which are arranged on two sides of the first lead screw and extend in the first direction; a first slide block and a second slide block, which are in sliding connection to the first slide rail and the second slide rail, respectively; a first connecting plate, which is connected to the first slide block, the second slide block and the first spiral transmission member; and at least one first positioning block, which is arranged on the first connecting plate, where a top of the first positioning block is provided with a first supporting portion configured to clamp the piece-to-be-transferred.

In the implementation, the at least one first positioning block is arranged on the first connecting plate, the first connecting plate is connected to the first slide block and the second slide block, and may be driven by the first spiral transmission member to reciprocate in the first direction relative to the first slide rail and the second slide rail, so as to drive the at least one first positioning block to reciprocate in the first direction, and further to adjust the distance between the first positioning block and the second locking assembly. The structure and principle are relatively simple, and implementation is easy.

In some implementations of the present application, the second locking assembly includes: a third slide rail and a fourth slide rail, which are arranged on two sides of the first lead screw and extend in the first direction; a third slide block and a fourth slide block, which are in sliding connection to the third slide rail and the fourth slide rail, respectively; a second connecting plate, which is connected to the third slide block, the fourth slide block and the second spiral transmission member; and at least one second positioning block, which is arranged on the second connecting plate, where a top of the second positioning block is provided with a second supporting portion, and the first supporting portion and the second supporting portion are configured to cooperate to fix the piece-to-be-transferred.

In the implementation, the at least one second positioning block is arranged on the second connecting plate, and the second connecting plate is connected to the third slide block and the fourth slide block, and may be driven by the second spiral transmission member to reciprocate in the first direction relative to the third slide rail and the fourth slide rail, so as to drive the at least one second positioning block to reciprocate in the first direction. Further, the second supporting portion on the second positioning block and the first supporting portion on the first positioning block may cooperate to fix the piece-to-be-transferred.

In some implementations of the present application, in a second direction perpendicular to the first direction in the horizontal plane, a plurality of first connecting portions are arranged on the first connecting plate and the second connecting plate at intervals, bottoms of the first positioning block and the second positioning block are provided with second connecting portions, and the first connecting portions are in detachable connection to the second connecting portions.

In the implementation, the plurality of first connecting portions are arranged on the first connecting plate and the second connecting plate, the plurality of first connecting portions are arranged at intervals in the second direction perpendicular to the first direction, and the first positioning block and the second positioning block are in detachable connection to the first connecting portions by means of the second connecting portions, such that in the case of a plurality of first positioning blocks and second positioning blocks, each first positioning block or second positioning block may be selectively connected to one of the plurality of first connecting portions by means of the second connecting portion. Further, distances between the plurality of first positioning blocks or the plurality of second positioning blocks may be adjusted, so as to fix pieces-to-be-transferred having different specifications and sizes in a compatible manner.

In some implementations of the present application, one of the first connecting portion and the second connecting portion is a positioning recess, the other one is a positioning column, and the positioning column is inserted into the positioning recess.

In the implementation, one of the first connecting portion and the second connecting portion is a positioning recess, and the other one is a positioning column. That is, the first connecting portion is a positioning recess, and the second connecting portion is a positioning column; or the first connecting portion is a positioning column, and the second connecting portion is a positioning recess. The positioning column is inserted into the positioning recess, such that the first positioning block is connected to the first connecting plate, and the second positioning block is connected to the second connecting plate.

In some implementations of the present application, an outer surface of the positioning column is provided with a snap-fit protrusion, an inner circumferential surface of the positioning recess is provided with a snap-fit groove, and when the positioning column is inserted into the positioning recess, the snap-fit protrusion is in snap-fit with the snap-fit groove.

In the implementation, the outer surface of the positioning column is provided with the snap-fit protrusion, and the inner circumferential surface of the positioning recess is provided with the snap-fit recess. In this way, when the positioning column is inserted into the positioning recess, the snap-fit protrusion may be in snap-fit with the snap-fit groove, which is conducive to further improvement in connection reliability between the first positioning block and the first connecting plate, and between the second positioning block and the second connecting plate, and facilitates separation of the first positioning block from the first connecting plate, and separation of the second positioning block from the second connecting plate under the action of an external force, thereby improving assembly and disassembly efficiency of a product.

In some implementations of the present application, the first supporting portion includes a first step structure, and the first step structure faces the second positioning block and is provided with a first step surface configured to support the piece-to-be-transferred; and the second supporting portion includes a second step structure, and the second step structure faces the first positioning block and is provided with a second step surface configured to support the piece-to-be-transferred.

In the implementation, the first step surface and the second step surface are configured to support the piece-to-be-transferred at the same time, and the first step structure and the second step structure may clamp the piece-to-be-transferred when moving toward each other, so as to play a limiting role, thereby improving stability of the piece-to-be-transferred in a transfer process.

In some implementations of the present application, two ends of the first connecting plate and two ends of the second connecting plate are all provided with first casters and second casters, and the first casters and the second casters are in rolling connection to the positioning platform.

In the implementation, the two ends of the first connecting plate and the two ends of the second connecting plate are provided with the first casters and the second casters. In this way, when the first connecting plate is driven by the first spiral transmission member to reciprocate, the first casters and the second casters are in rolling connection to the positioning platform, so as to play a role in supporting the first connecting plate, and avoid the situation that the first connecting plate is inclined due to uneven stress, which is conducive to improvement in movement stability of the first connecting plate, and further conducive to improvement in stability of a piece-to-be-transferred in a transfer process.

In some implementations of the present application, the positioning transmission mechanism further includes: a first limiting assembly, a second limiting assembly, and a second driving assembly connected to the first limiting assembly, where the first limiting assembly and the second limiting assembly are arranged on two opposite sides of the positioning platform at an interval in the second direction in the horizontal plane, and the second driving assembly is configured to drive the first limiting assembly to move in a direction toward or away from the second limiting assembly, such that the first limiting assembly and the second limiting assembly cooperate to clamp the piece-to-be-transferred; and the second direction is perpendicular to the first direction.

In the implementation, after the first locking assembly and the second locking assembly fix two ends of the piece-to-be-transferred in the first direction, the first limiting assembly and the second limiting assembly may be driven by the second driving assembly to clamp two ends of the piece-to-be-transferred in the second direction, so as to improve stability of the piece-to-be-transferred in a transfer process. In addition, the first limiting assembly and the second limiting assembly may be driven by the second driving assembly to move toward or away from each other, so as to adjust a distance between the first limiting assembly and the second limiting assembly in the second direction, such that the first locking assembly and the second locking assembly cooperate to fix and then transfer pieces-to-be-transferred having different specifications and sizes.

In some implementations of the present application, the second driving assembly includes: a second driving member; and a second transmission assembly, which is connected to the second driving member and the first limiting assembly, where the second driving member is configured to drive the second transmission assembly to move, so as to drive the first limiting assembly to move in the direction toward or away from the second limiting assembly.

In the implementation, the first limiting assembly is a movable assembly, and the second limiting assembly is a fixed assembly. When the second driving member drives the second transmission assembly to move, the first transmission assembly may drive the first limiting assembly to move in the direction toward or away from the second limiting assembly, such that the first limiting assembly and the second limiting assembly cooperate to clamp two ends of the piece-to-be-transferred in the second direction.

In some implementations of the present application, the second transmission assembly includes: a second lead screw, which extends in the second direction; and a third spiral transmission member, which is in threaded connection to the second lead screw, and is connected to the first limiting assembly, where when the second driving member drives the second lead screw to rotate, the third spiral transmission member is adapted to reciprocate along the second lead screw, so as to drive the first limiting assembly to move in the direction toward or away from the second limiting assembly.

In the implementation, the second transmission assembly includes the second lead screw and the third spiral transmission member, the third spiral transmission member is in threaded connection to the second lead screw, and the third spiral transmission member and the second lead screw form a ball screw structure. In this way, since the third spiral transmission member is connected to the first limiting assembly, when the second driving member drives the second lead screw to rotate, the third spiral transmission member may drive the first limiting assembly to reciprocate in the second direction. Therefore, the distance between the first limiting assembly and the second limiting assembly may be adjusted, so as to match pieces-to-be-transferred having different lengths in the second direction.

In some implementations of the present application, the first limiting assembly includes: a fifth slide rail and a sixth slide rail, which are arranged on two sides of the second lead screw and extend in the second direction; a fifth slide block and a sixth slide block, which are in sliding connection to the fifth slide rail and the sixth slide rail, respectively; a third connecting plate, which is connected to the fifth slide block, the sixth slide block and the third spiral transmission member; and at least one first limiting block, which is arranged on the third connecting plate, and is configured to abut against the piece-to-be-transferred.

In the implementation, the third connecting plate is connected to the third spiral transmission member, the fifth slide block and the sixth slide block such that the third connecting plate may be driven by the third spiral transmission member to reciprocate in the second direction relative to the fifth slide rail and the sixth slide rail. The at least one first limiting block is arranged on the third connecting plate, such that when the third connecting plate moves in the second direction, the at least one first limiting block abuts against one end of the to-be-transported member in the second direction, and the at least one first limiting block and the second limiting assembly clamp the piece-to-be-transferred in a matching manner.

In some implementations of the present application, the second limiting assembly includes: a fourth connecting plate, which is parallel to the third connecting plate, where the fourth connecting plate and the third connecting plate are arranged on the positioning platform at an interval; and at least one second limiting block, which is arranged on the fourth connecting plate, and is configured to abut against the piece-to-be-transferred.

In the implementation, the second limiting assembly includes the fourth connecting plate and the at least one second limiting block, the fourth connecting plate is parallel to the third connecting plate, and the fourth connecting plate and the third connecting plate are arranged at an interval. In this way, when the third spiral transmission member drives the first limiting block on the third connecting plate to move, the first limiting block and the second limiting block may cooperate to abut against two ends of the piece-to-be-transferred in the second direction, so as to clamp the two ends of the piece-to-be-transferred in the second direction.

In some implementations of the present application, the supporting frame is provided with a positioning pin, the positioning platform is provided with a bearing guide sleeve matching the positioning pin, and the positioning pin is inserted into the bearing guide sleeve.

In the implementation, when the positioning platform is arranged on the supporting frame, the positioning pin is inserted into the bearing guide sleeve such that connection reliability between the positioning platform and the supporting frame can be improved, the situation that the positioning platform moves relative to the supporting frame is improved, which is conducive to improvement in stability of the piece-to-be-transferred in a transfer process.

In some implementations of the present application, the transfer device further includes: a handlebar, which is arranged at one end of the positioning platform.

In the implementation, the handlebar is configured to be held by an operator such that the operator can conveniently push the transfer device to move as required.

BRIEF DESCRIPTION OF ACCOMPANYING DRAWINGS

Various other advantages and benefits will become apparent to those of ordinary skill in the art upon reading the following detailed description of some implementations. Accompanying drawings are merely for the purpose of illustrating some implementations, and are not to be construed as limiting the present application. Moreover, the same reference numerals represent the same components throughout the accompanying drawings. In the accompanying drawings.

Figure 1:
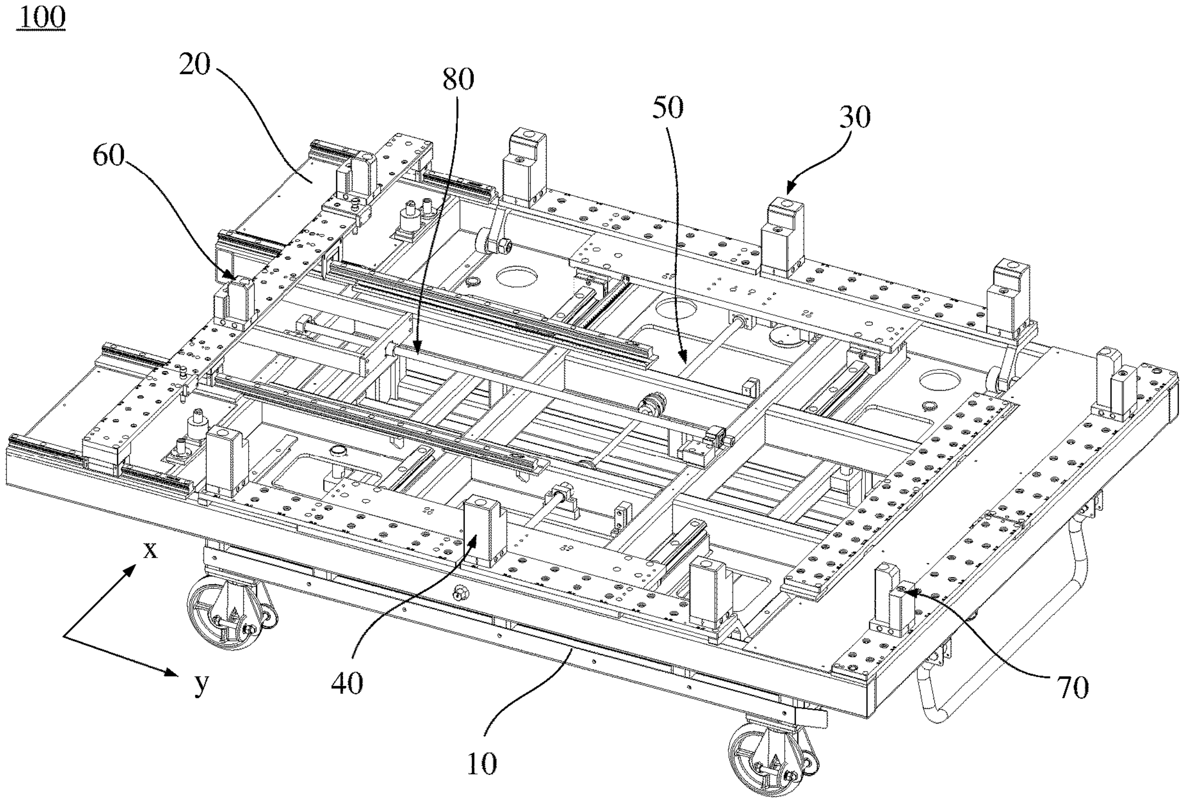
FIG. 1 is an assembled schematic diagram of a transfer device according to some embodiments of the present application.

LIST OF REFERENCE NUMERALS transfer device 100;

automated guided vehicle 10, positioning platform 20, first locking assembly 30, second locking assembly 40, first driving assembly 50, first limiting assembly 60, second limiting assembly 70, and second driving assembly 80;

supporting frame 11, bearing guide sleeve 21, handlebar 22, first slide rail 31, second slide rail 32, first slide block 33, second slide block 34, first connecting plate 35, first positioning block 36, third slide rail 41, fourth slide rail 42, second connecting plate 43, second positioning block 44, first lead screw 51, first spiral transmission member 52, coupler 53, fifth slide rail 61, sixth slide rail 62, fifth slide block 63, sixth slide block 64, third connecting plate 65, first limiting block 66, fourth connecting plate 71, second limiting block 72, reference plate 73, second lead screw 81, and third spiral transmission member 82;

positioning pin 111, positioning recess 351, first caster 352, second caster 353, positioning column 361, first step structure 362, and first step surface 363; and snap-fit protrusion 3611.

A direction of an x-axis of a coordinate system in FIG. 1 is a first direction, and a direction of a y-axis is a second direction.

DETAILED DESCRIPTION OF EMBODIMENTS

Implementations of technical solutions of the present application will be described in detail in combination with accompanying drawings. The following implementations are merely used for illustrating technical solutions of the present application more clearly, and therefore merely serve as examples rather than limiting the scope of protection of the present application.

Unless otherwise defined, all technical and scientific terms used herein have the same meanings as those commonly understood by those skilled in the art to which the present application belongs. Terms used herein are merely for the purpose of describing particular implementations, but are not intended to limit the present application. Terms "include", "comprise", "have" and their any variations in the description and claims of the present application as well as the above brief description of accompanying drawings are intended to cover non-exclusive inclusions.

In the description of implementations of the present application, terms "first" and "second" are merely used for distinguishing different objectives, and cannot be construed as indicating or implying relative importance or implicitly indicating the quantity, specific sequence or primary and secondary relations of technical features indicated. In the description of implementations of the present application, "a plurality of" means two or more, unless expressly specified otherwise.

Reference to an "implementation" herein means that a specific feature, structure or characteristic described in combination with an implementation can be included in at least one implementation of the present application. Appearance of this phrase in all positions in the description does not necessarily mean the same implementation, nor is an independent or alternative implementation mutually exclusive with other implementations. Those skilled in the art explicitly and implicitly understand that implementations described herein can be combined with other implementations.

In the description of implementations of the present application, term "and/or" is merely an association relation describing an associated object, and means that there can be three relations. For example, A and/or B can represent: only A exists, both A and B exist, or only B exists. In addition, the character "/" herein generally indicates an "or" relation between associated objects.

In the description of implementations of the present application, term "a plurality of" refers to two or more (including two). Similarly, "a plurality of groups" refers to two or more groups (including two groups), and "a plurality of pieces" refers to two or more pieces (including two pieces).

In the description of implementations of the present application, orientation or position relations indicated by terms "center", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial", "circumferential", etc. are based on orientation or position relations shown in accompanying drawings, and are merely for convenience of description of implementations of the present application and simplification of the description, rather than indicating or implying that a device or element referred to must have a specific orientation or be constructed and operated in a described orientation, and therefore cannot be construed as limiting the present application.

In the description of implementations of the present application, unless otherwise explicitly specified and defined, terms "mount", "connected", "connect", "fix", etc. should be interpreted in the broad sense. For example, a connection may be a fixed connection, a detachable connection, or an integral connection; may be a mechanical connection or an electric connection; and may be a direct connection or an indirect connection by means of an intermediate medium, or may be communication between interiors of two elements or interaction between the two elements. Those of ordinary skills in the art can understand specific meanings of the above terms in implementations of the present application according to specific circumstances.

At present, from the perspective of the development of the market situation, traction batteries are used more and more widely. The traction batteries are not only used in energy storage power systems such as hydraulic power, thermal power, wind power and solar power stations, but also widely used in electric vehicles such as electric bicycles, electric motorcycles, electric vehicles, aerospace and other fields. With the continuous expansion of the application field of traction batteries, market demand for the traction batteries is also expanding.

In the related art, a semi-automatic apparatus is mainly used on a battery production line to process, assemble, transmit and detect batteries. On the battery production line, battery components in a previous procedure are generally transferred to a next procedure by a transfer device and then are assembled.

Inventors of the present application note that since each transfer device in a battery production line is only suitable for battery components with the same specification and dimension, and cannot automatically adapt to products with different sizes, during changeover, it is required to manually change the transfer device, resulting in relatively low production efficiency, and relatively high cost.

In order to solve the problems that during changeover, the transfer device is required to be manually changed, resulting in relatively low production efficiency, and relatively high costs, inventors of the present application designs a transfer device after in-depth research. A first driving assembly of a positioning transmission mechanism is configured to drive a first locking assembly and a second locking assembly to move toward or away from each other in a first direction of a positioning platform, such that the first locking assembly and the second locking assembly cooperate to support and fix two ends of a piece-to-be-transferred in the first direction, so as to be compatible with pieces-to-be-transferred having different specifications and sizes. Therefore, during changeover, the transfer device is not required to be changed, as long as a distance between the first locking assembly and the second locking assembly is adjusted, such that production efficiency during changeover is effectively improved, and production costs are reduced.

The transfer device 100 disclosed in an embodiment of the present application is not only suitable for transferring battery components in a battery production line, but also suitable for transferring parts in an automobile production line, a ship production line, etc.

In the following embodiments, for convenience of description, a transfer device for a battery production line in an embodiment of the present application is described.

Figure 2:
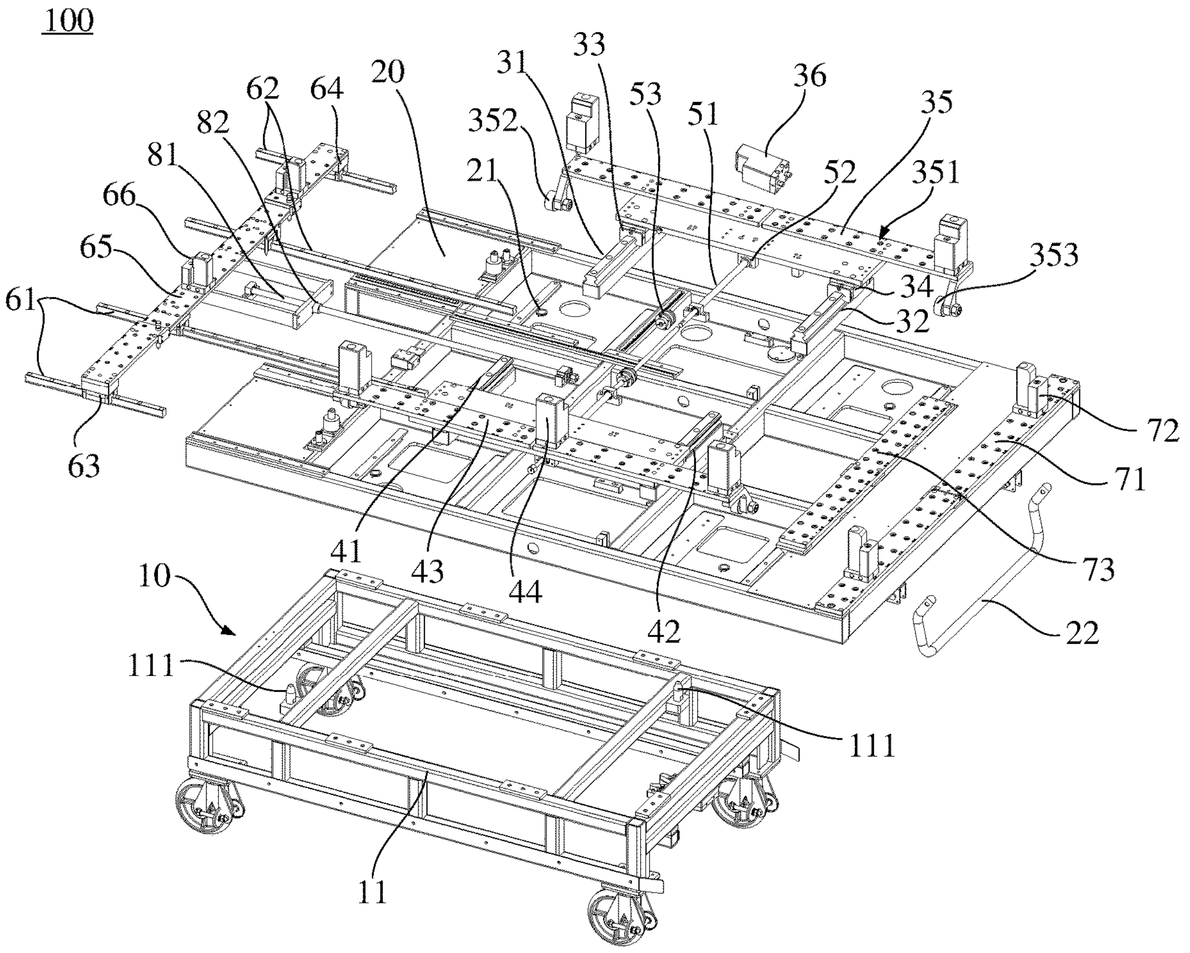
FIG. 2 is an exploded schematic diagram of a transfer device according to some embodiments of the present application.

With reference to FIGS. 1 and 2, an assembled schematic diagram of a transfer device according to some embodiments of the present application is shown in FIG. 1; and an exploded schematic diagram of a transfer device according to some embodiments of the present application is shown in FIG. 2. According to some embodiments of the present application, the present application provides a transfer device 100. The transfer device includes: an automated guided vehicle 10, a positioning platform 20 and a positioning transmission mechanism. The automated guided vehicle 10 is provided with a supporting frame 11; the positioning platform 20 is arranged on the supporting frame 11; and the positioning transmission mechanism includes a first locking assembly 30, a second locking assembly 40, and a first driving assembly 50 connected to the first locking assembly 30 and the second locking assembly 40, where the first locking assembly 30 and the second locking assembly 40 are arranged on two opposite sides of the positioning platform 20 at an interval in a first direction in a horizontal plane, and the first driving assembly 50 is configured to drive the first locking assembly and the second locking assembly to move toward or away from each other, such that the first locking assembly 30 and the second locking assembly 40 cooperate to fix a piece-to-be-transferred.

The automated guided vehicle 10 is a transport vehicle equipped with an electromagnetic automated guided device, an optical automated guided device, etc., may travel along a specified guidance path, and has safety protection and various transfer functions. The first locking assembly and the second locking assembly are configured to cooperate to support and fix the piece-to-be-transferred. The first driving assembly 50 is configured to provide power when the first locking assembly and the second locking assembly move toward or away from each other.

The first driving assembly 50 drives the first locking assembly 30 and the second locking assembly 40 to move toward or away from each other, such that by adjusting a distance between the first locking assembly 30 and the second locking assembly, the first locking assembly 30 and the second locking assembly cooperate to fix two ends of the piece-to-be-transferred in the first direction. Further, space between the first locking assembly 30 and the second locking assembly 40 may be compatible with pieces-to-be-transferred having different specifications and sizes, and the transfer device 100 is not required to be changed during changeover. Therefore, production efficiency during changeover is effectively improved, and the transfer device is conducive to reduction in labor costs and production costs.

According to some embodiments of the present application, the first driving assembly 50 includes a first driving member (not shown in figures) and a first transmission assembly connected to the first driving member, the first transmission assembly is connected to the first locking assembly 30 and the second locking assembly 40, and the first driving member is configured to drive the first transmission assembly to move, so as to drive the first locking assembly 30 and the second locking assembly 40 to move toward or away from each other.

As an example, the first driving member is an electric motor, and the first transmission assembly is a ball screw structure.

Specifically, the first transmission assembly includes a first lead screw 51, a first spiral transmission member 52 and a second spiral transmission member. The first lead screw 51 extends in the first direction and is connected to the first driving member, two ends of the first lead screw 51 are provided with a first thread and a second thread, respectively, and the first thread and the second thread are arranged in opposite directions. The first spiral transmission member 52 is in threaded connection to the first thread, the second spiral transmission member is in threaded connection to the second thread, the first spiral transmission member is connected to the first locking assembly 30, the second spiral transmission member is connected to the second locking assembly 40, and when the first lead screw 51 rotates, the first spiral transmission member 52 and the second spiral transmission member are adapted to move toward or away from each other along the first lead screw 51.

Two ends of the first thread 51 are in rotating connection to the positioning platform 20, and the first spiral transmission member 52 and the second spiral transmission member are in threaded connection to the first thread and the second thread, respectively, such that the first spiral transmission member 52, the second spiral transmission member and the first lead screw 51 form a ball screw structure. Since the first thread and the second thread are arranged in opposite directions, when the first lead screw 51 is driven by the first driving member to rotate, the first spiral transmission member 52 and the second spiral transmission member may move toward or away from each other along the first lead screw 51, so as to drive the first locking assembly 30 and the second locking assembly 40 to move toward or away from each other. Therefore, the distance between the first locking assembly 30 and the second locking assembly 40 may be adjusted, so as to be compatible with pieces-to-be-transferred having different specifications and sizes.

With reference to FIGS. 1 and 2, according to an embodiment of the present application, the first transmission assembly includes a plurality of first lead screws 51, a first spiral transmission member 52 and a second spiral transmission member. The plurality of first lead screws 51 are connected to each other by means of a coupler 53, the two first lead screws 51 located on two ends of the positioning platform 20 in the first direction are provided with a first thread and a second thread, respectively, the first thread and the second thread are arranged in opposite directions, the first spiral transmission member 52 and the second spiral transmission member are in threaded connection to the first thread and the second thread, respectively, the first spiral transmission member 52 is connected to the first locking assembly 30, and the second spiral transmission member is connected to the second locking assembly 40. When the first driving member drives one of the first lead screws 51 to rotate, the first spiral transmission member 52 and the second spiral transmission member may drive the first locking assembly 30 and the second locking assembly 40 to move toward or away from each other.

With reference to FIGS. 1 and 2, according to some embodiments of the present application, the first locking assembly 30 includes a first slide rail 31, a second slide rail 32, a first slide block 33, a second slide block 34, a first connecting plate 35 and at least one first positioning block 36. The first slide rail 31 and the second slide rail 32 are arranged on two sides of the first lead screw 51 and extend in the first direction. The first slide block 33 and the second slide block 34 are in sliding connection to the first slide rail 31 and the second slide rail 32, respectively. The first connecting plate 35 is connected to the first slide block 33, the second slide block 34 and the first spiral transmission member 52. The at least one first positioning block 36 is arranged on the first connecting plate 35, and a top of the first positioning block 36 is provided with a first supporting portion configured to clamp the piece-to-be-transferred.

With reference to FIGS. 1 and 2, according to some embodiments of the present application, the second locking assembly 40 includes: a third slide rail 41 and a fourth slide rail 42, which are arranged on two sides of the first lead screw 51 and extend in the first direction; a third slide block and a fourth slide block, which are in sliding connection to the third slide rail 41 and the fourth slide rail 42, respectively; a second connecting plate 43, which is connected to the third slide block, the fourth slide block and the second spiral transmission member; and at least one second positioning block 44, which is arranged on the second connecting plate 43, where a top of the second positioning block 44 is provided with a second supporting portion, and the first supporting portion and the second supporting portion are configured to cooperate to fix the piece-to-be-transferred.

One or more first positioning blocks 36 may be arranged. In the case of a plurality of first positioning blocks 36, the plurality of first positioning blocks 36 are arranged on the first connecting plate 35 at intervals.

One or more second positioning blocks 44 may be arranged. In the case of a plurality of the second positioning blocks 44, the plurality of second positioning blocks 44 are arranged on the second connecting plate 43 at intervals.

The first supporting portion and the second supporting portion are configured to support one end of the piece-to-be-transferred in the first direction, and are configured to clamp the piece-to-be-transferred when the first positioning block 36 and the second positioning block 44 move toward each other, so as to ensure stability during transfer.

The at least one first positioning block 36 is arranged on the first connecting plate 35, and the first connecting plate 35 is connected to the first spiral transmission member 52, a first slide block 33 and a second slide block 34 such that the first connecting plate 35 may be driven by the first spiral transmission member 52 to reciprocate in the first direction relative to the first slide rail 31 and the second slide rail 32, so as to drive the at least one first positioning block 36 to reciprocate in the first direction.

Similarly, the at least one second positioning block 44 is arranged on the second connecting plate 43, and the second connecting plate 43 is connected to the second spiral transmission member, a third slide block and a fourth slide block, such that the second connecting plate 43 may be driven by the second spiral transmission member to reciprocate in the first direction relative to the third slide rail 41 and the fourth slide rail 42, so as to drive the at least one first positioning block 36 to reciprocate in the first direction. Therefore, the distance between the first positioning block 36 and the second positioning assembly 44 is adjusted, so as to adapt to pieces-to-be-transferred of different specifications and sizes. Then, the first supporting portion and the second supporting portion on the first positioning block 36 and the second positioning block 44 support and fix the two ends of the piece-to-be-transferred in the first direction. The structure and principle are relatively simple, and implementation is easy.

With reference to FIGS. 1 and 2, according to some embodiments of the present application, in a second direction perpendicular to the first direction in the horizontal plane, a plurality of first connecting portions are arranged on the first connecting plate 35 and the second connecting plate 43 at intervals, bottoms of the first positioning block 36 and the second positioning block 44 are provided with second connecting portions, and the first connecting portions are in detachable connection to the second connecting portions.

The first connecting portions are in detachable connection to the second connecting portions, and a plurality of first connecting portions are arranged. In the case of a plurality of first positioning blocks 36 and second positioning blocks 44, each first positioning block 36 or second positioning block 44 may be selectively connected to one of the plurality of first connecting portions by means of the second connecting portion. Further, distances between the plurality of first positioning blocks 36 or the plurality of second positioning blocks 44 are adjusted, such that the first positioning blocks 36 and the second positioning block 44 may effectively support and fix pieces-to-be-transferred having different specifications and sizes, so as to ensure support and fixation reliability of the piece-to-be-transferred.

With reference to FIGS. 1 and 2, according to some embodiments of the present application, one of the first connecting portion and the second connecting portion is a positioning recess 351, the other one is a positioning column 361, and the positioning column 361 is inserted into the positioning recess 351.

One of the first connecting portion and the second connecting portion is a positioning recess 351, and the other one is a positioning column 361. That is, the first connecting portion is a positioning recess 351, and the second connecting portion is a positioning column 361; or the first connecting portion is a positioning column 361, and the second connecting portion is a positioning recess 351.

When the first positioning block 36 is assembled with the first connecting plate 35, the positioning column 361 of the first positioning block 36 is inserted into the positioning recess 351 of the first connecting plate 35, such that the first positioning block 36 is connected to the first connecting plate 35. When the second positioning block 44 is assembled with the second connecting plate 43, the positioning column 361 of the second positioning block 44 is inserted into the positioning recess 351 of the second connecting plate 43, such that the second positioning block 44 is connected to the second connecting plate 43, and assembly efficiency of a product is improved.

Figure 3:
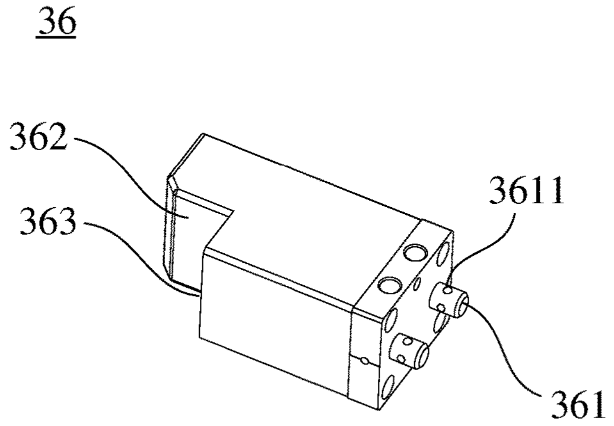
FIG. 3 is a perspective schematic diagram of a first positioning column from an angle of view according to some embodiments of the present application.

With reference to FIG. 3, a schematic diagram of a positioning block according to some embodiments of the present application is shown in FIG. 3. According to some embodiments of the present application, an outer surface of the positioning column 361 is provided with a snap-fit protrusion 3611, an inner circumferential surface of the positioning recess 351 is provided with a snap-fit groove, and when the positioning column 361 is inserted into the positioning recess 351, the snap-fit protrusion 3611 is in snap-fit with the snap-fit groove.

As an example, a plurality of snap-fit protrusions 3611 are arranged, and the plurality of the snap-fit protrusions 3611 are arranged at intervals on an outer circumferential side of the positioning column 361. A plurality of snap-fit grooves are arranged, and the plurality of snap-fit grooves are provided at intervals along an inner circumferential surface of the positioning recess 351.

The outer surface of the positioning column 361 is provided with the snap-fit protrusion 3611, and the inner circumferential surface of the positioning recess 351 is provided with the snap-fit groove. In this way, when the positioning column 361 is inserted into the positioning recess 351, the snap-fit protrusion 3611 may be in snap-fit with the snap-fit groove, which is conducive to further improvement in connection reliability between the first positioning block 36 and the first connecting plate 35, and between the second positioning block 44 and the second connecting plate 43, and facilitates separation of the first positioning block 36 from the first connecting plate 35, and separation of the second positioning block 44 from the second connecting plate 43 under the action of an external force, thereby improving assembly and disassembly efficiency of a product.

With reference to FIGS. 1-3, according to some embodiments of the present application, the first supporting portion includes a first step structure 362, and the first step structure 362 faces the second positioning block 44 and is provided with a first step surface 363 configured to support the piece-to-be-transferred. The second supporting portion includes a second step structure, and the second step structure faces the first positioning block 36 and is provided with a second step surface configured to support the piece-to-be-transferred.

A top of the first positioning block 36 is partially recessed towards a side of the second positioning block 44 to form the first step structure 362, and a top of the second positioning block 44 is partially recessed towards a side of the first positioning block 36 to form the second step structure.

The first step surface 363 and the second step surface are configured to support the piece-to-be-transferred at the same time, and when the first positioning block 36 and the second positioning block 44 to move toward each other, the first step structure 362 and the second step structure may cooperate to clamp the piece-to-be-transferred, so as to play a limiting role, thereby improving stability of the piece-to-be-transferred in a transfer process.

With reference to FIGS. 1 and 2, according to some embodiments of the present application, two ends of the first connecting plate 35 and two ends of the second connecting plate 43 are all provided with first casters 352 and second casters 353, and the first casters 352 and the second casters 353 are in rolling connection to the positioning platform 20.

The two ends of the first connecting plate 35 and the two ends of the second connecting plate 43 in the second direction are all provided with the first casters 352 and the second casters 353. In this way, when the first connecting plate 35 is driven by the first spiral transmission member 52 to reciprocate, the first casters 352 and the second casters 353 on the first connecting plate 35 are in rolling connection to the positioning platform 20, so as to play a role in supporting the first connecting plate 35, and avoid the situation that the first connecting plate 35 is inclined due to uneven stress, which is conducive to improvement in movement stability of the first connecting plate 35. Similarly, when the second connecting plate 43 is driven by the second spiral transmission member to reciprocate, the first casters 352 and the second casters 353 on the second connecting 43 are in rolling connection to the positioning platform 20, so as to play a role in supporting the second connecting plate 43, and avoid the situation that the second connecting plate 43 is inclined due to uneven stress, which is conducive to improvement in movement stability of the second connecting plate 43, and further conducive to improvement in stability of a piece-to-be-transferred in a transfer process.

With reference to FIGS. 1 and 2, according to some embodiments of the present application, the positioning transmission mechanism further includes: a first limiting assembly 60, a second limiting assembly 70, and a second driving assembly 80 connected to the first limiting assembly 60. The first limiting assembly 60 and the second limiting assembly 70 are arranged on two opposite sides of the positioning platform 20 at an interval in the second direction in the horizontal plane, and the second driving assembly 80 is configured to drive the first limiting assembly 60 to move in a direction toward or away from the second limiting assembly 70, such that the first limiting assembly 60 and the second limiting assembly 70 cooperate to clamp the piece-to-be-transferred; and the second direction is perpendicular to the first direction.

The first limiting assembly 60 and the second limiting assembly 70 are configured to fix two ends of the piece-to-be-transferred in the second direction, such that the piece-to-be-transferred is relatively fixed relative to the positioning platform 20 in the second direction.

After the first locking assembly 30 and the second locking assembly 40 fix two ends of the piece-to-be-transferred in the first direction in the horizontal plane, the first limiting assembly 60 and the second limiting assembly 70 may be driven by the second driving assembly 80 to clamp two ends of the piece-to-be-transferred in the second direction, so as to improve stability of the piece-to-be-transferred in a transfer process. In addition, the first limiting assembly 60 and the second limiting assembly 70 may be driven by the second driving assembly 80 to move toward or away from each other, so as to adjust a distance between the first limiting assembly 60 and the second limiting assembly 70 in the second direction, such that the first locking assembly 30 and the second locking assembly 40 cooperate to fix pieces-to-be-transferred having different specifications and sizes.

According to some embodiments of the present application, the second driving assembly 80 includes a second driving member (not shown in figures) and a second transmission assembly connected to the second driving member, and the second transmission assembly is connected to the first limiting assembly 60. The second driving member is configured to drive the second transmission assembly to move, so as to drive the first limiting assembly 60 to move in the direction toward or away from the second limiting assembly 70.

As an example, the second driving member is an electric motor, and the second transmission assembly is a ball screw structure.

It can be understood that the first limiting assembly 60 is a movable assembly, and the second limiting assembly 70 is a fixed assembly. Certainly, the second transmission assembly may be connected to the first limiting assembly 60 and the second limiting assembly 70, so as to drive the first limiting assembly 60 and the second limiting assembly 70 to move at the same time.

When the second driving member drives the second transmission assembly to move, the first transmission assembly may drive the first limiting assembly 60 to move in the direction toward or away from the second limiting assembly 70, such that the first limiting assembly and the second limiting assembly 70 cooperate to clamp two ends of the piece-to-be-transferred in the second direction.

With reference to FIGS. 1 and 2, according to some embodiments of the present application, the second transmission assembly includes a second lead screw 81 and a third spiral transmission member 82 in threaded connection to the second lead screw 81. The second lead screw 81 extends in the second direction, the third spiral transmission member 82 is connected to the first limiting assembly 60, and when the second driving member drives the second lead screw 81 to rotate, the third spiral transmission member 82 is adapted to reciprocate along the second lead screw 81, so as to drive the first limiting assembly 60 to move in the direction toward or away from the second limiting assembly 70.

Two ends of the second lead screw 81 are in rotating connection to the positioning platform 20, the second lead screw 81 is perpendicular to the first lead screw 51, and the second lead screw 81 is arranged at a different height from the first lead screw 51.

Since the third spiral transmission member 82 is connected to the first limiting assembly 60, when the second driving member drives the second lead screw 81 to rotate, the third spiral transmission member 82 may drive the first limiting assembly 60 to reciprocate in the second direction. Therefore, the distance between the first limiting assembly 60 and the second limiting assembly 70 may be adjusted, so as to fix pieces-to-be-transferred having different lengths in the second direction in an adjustable manner.

With reference to FIGS. 1 and 2, according to some embodiments of the present application, the first limiting assembly 60 includes a fifth slide rail 61, a sixth slide rail 62, a fifth slide block 63, a sixth slide block 64, a third connecting plate 65 and at least one first limiting block 66. The fifth slide rail 61 and the sixth slide rail 62 are arranged on two sides of the second lead screw 81 and extend in the second direction. The fifth slide block 63 and the sixth slide block 64 are in sliding connection to the fifth slide rail 61 and the sixth slide rail 62, respectively. The third connecting plate 65 is connected to the fifth slide block 63, the sixth slide block 64 and the third spiral transmission member 82. The at least one first limiting block 66 is arranged on the third connecting plate 65, and is configured to abut against one end of the piece-to-be-transferred in the second direction.

With reference to FIGS. 1 and 2, according to some embodiments of the present application, the second limiting assembly 70 includes a fourth connecting plate 71 and at least one second limiting block 72 arranged on the fourth connecting plate 71. The fourth connecting plate 71 is parallel to the third connecting plate 65, and the fourth connecting plate and the third connecting plate 65 are arranged on two ends of the positioning platform 20 at an interval. The at least one second limiting block 72 is configured to abut against the piece-to-be-transferred.

The third connecting plate 65 is connected to the third spiral transmission member 82, the fifth slide block 63 and the sixth slide block 64 such that the third connecting plate may be driven by the third spiral transmission member 82 to reciprocate in the second direction relative to the fifth slide rail 61 and the sixth slide rail 62. The at least one first limiting block 66 is arranged on the third connecting plate 65, such that when the third connecting plate 65 moves in the second direction, the at least one first limiting block 66 may abut against one end of the piece-to-be-transferred in the second direction.

The fourth connecting plate 71 and the third connecting plate 65 are arranged in parallel to each other at an interval, such that when the third spiral transmission member 82 drives the first limiting block 66 on the third connecting plate 65 to move, the first limiting block 66 and the second limiting block 72 may cooperate to abut against two ends of the piece-to-be-transferred in the second direction, so as to clamp the two ends of the piece-to-be-transferred in the second direction.

It can be understood that a height of the first limiting block 66 and a height of the second limiting block 72 are greater than a height of the first step surface 363 and a height of the second step surface.

Specifically, the third connecting plate 65 and the fourth connecting plate 71 are further provided with a plurality of positioning recesses 351, the plurality of positioning recesses 351 on the third connecting plate 65 and the fourth connecting plate 71 are provided at intervals in the first direction, bottoms of the first limiting block 66 and the second limiting block 72 are provided with positioning columns 361, and the positioning columns 361 are inserted into the positioning recesses 351.

With reference to FIGS. 1 and 2, according to some embodiments of the present application, the supporting frame 11 is provided with a positioning pin 111, the positioning platform 20 is provided with a bearing guide sleeve 21 matching the positioning pin 111, and the positioning pin 111 is inserted into the bearing guide sleeve 21.

When the positioning platform 20 is arranged on the supporting frame 11, the positioning pin 111 is inserted into the bearing guide sleeve 21 such that connection reliability between the positioning platform 20 and the supporting frame 11 can be improved. Moreover, a position of the positioning platform 20 relative to the supporting frame 11 is relatively fixed, which is conducive to improvement in stability of the piece-to-be-transferred in a transfer process.

With reference to FIGS. 1 and 2, according to some embodiments of the present application, the transfer device 100 further includes a handlebar 22, which is arranged at one end of the positioning platform 20.

The handlebar 22 is configured to be held by an operator such that the operator can conveniently push the transfer device 100 to move as required.

With reference to FIGS. 1 and 2, according to some embodiments of the present application, the positioning platform 20 is further provided with a reference plate 73. The reference plate 73, the third connecting plate 65 and the fourth connecting plate 71 are parallel to each other at intervals, and the reference plate is configured to provide a positioning reference when a piece-to-be-transferred is fixed.

According to some embodiments of the present application, the positioning platform 20 is provided with a first graduated scale and a second graduated scale. The first graduated scale extends from one end of the positioning platform 20 to the other end in the first direction, and is configured to measure a moving distance of the first locking assembly 30. The second graduated scale extends from one end of the positioning platform 20 to the other end in the second direction, and is configured to measure a moving distance of the first limiting assembly 60.

With reference to FIGS. 1 and 2, according to some embodiments of the present application, the present application provides a transfer device 100. The transfer device includes an automated guided vehicle 10, a positioning platform 20 and a positioning transmission mechanism. The automated guided vehicle 10 is provided with a supporting frame 11. The positioning platform 20 is arranged on the supporting frame 11. The positioning transmission mechanism includes a first locking assembly 30, a second locking assembly 40, a first limiting assembly 60, a second limiting assembly 70, a first driving assembly 50 connected to the first locking assembly 30 and the second locking assembly 40, and a second driving assembly 80 connected to the first limiting assembly 60. The first locking assembly 30 and the second locking assembly 40 are arranged on two opposite sides of the positioning platform 20 at an interval in a first direction in the horizontal plane, and the first limiting assembly 60 and the second limiting assembly 70 are arranged on two opposite sides of the positioning platform 20 at an interval in a second direction perpendicular to the first direction in the horizontal plane. The first driving assembly 50 is configured to drive the first locking assembly 30 and the second locking assembly 40 to move toward or away from each other, such that the first locking assembly 30 and the second locking assembly 40 cooperate to lock two ends of the piece-to-be-transferred in the first direction. The second driving assembly 80 is configured to drive the first limiting assembly 60 to move toward or away from the second limiting assembly 70, such that the first limiting assembly 60 and the second limiting assembly 70 cooperate to lock two ends of the second limiting assembly 70. The distance between the first locking assembly 30 and the second locking assembly 40, and the distance between the first limiting assembly 60 and the second limiting assembly 70 may be adjusted, so as to be compatible with pieces-to-be-transferred having different specifications and sizes. Therefore, the transfer device 100 is not required to be changed during changeover, so as to improve production efficiency during changeover.

What are described above are merely optimal embodiments of the present application, and are not intended to limit the scope of protection of the present application. Any changes or substitutions that can readily occur to those skilled in the art within the scope of technology disclosed in the present application should all fall within the scope of protection of the present application. Therefore, the scope of protection of the present application shall be subject to the scope of protection of the claims.

What is claimed is:

1. A transfer device, comprising:

an automated guided vehicle, which is provided with a supporting frame;

a positioning platform, which is arranged on the supporting frame; and a positioning transmission mechanism, which comprises a first locking assembly, a second locking assembly, and a first driving assembly connected to the first locking assembly and the second locking assembly;

wherein:

the first locking assembly and the second locking assembly are arranged on two opposite sides of the positioning platform at an interval in a first direction in a horizontal plane; and the first driving assembly comprises:

a first driving member; and a first transmission assembly comprising:

a first lead screw connected to the first driving member, and extending in the first direction, two ends of the first lead screw being provided with a first thread and a second thread, respectively, and the first thread and the second thread being arranged in opposite directions; and a first spiral transmission member and a second spiral transmission member, wherein the first spiral transmission member is in threaded connection to the first thread, the second spiral transmission member is in threaded connection to the second thread, the first spiral transmission member is connected to the first locking assembly, the second spiral transmission member is connected to the second locking assembly, and when the first lead screw rotates, the first spiral transmission member and the second spiral transmission member are adapted to move toward or away from each other along the first lead screw.

2. The transfer device according to claim 1, wherein the first driving member is configured to drive the first transmission assembly to move, so as to drive the first locking assembly and the second locking assembly to move toward or away from each other.

3. The transfer device according to claim 1, wherein the first locking assembly comprises:

a first slide rail and a second slide rail, which are arranged on two sides of the first lead screw and extend in the first direction;

a first slide block and a second slide block, which are in sliding connection to the first slide rail and the second slide rail, respectively;

a first connecting plate, which is connected to the first slide block, the second slide block and the first spiral transmission member; and at least one first positioning block, which is arranged on the first connecting plate, wherein a top of the first positioning block is provided with a first supporting portion configured to clamp the piece-to-be-transferred.

4. The transfer device according to claim 3, wherein the second locking assembly comprises:

a third slide rail and a fourth slide rail, which are arranged on two sides of the first lead screw and extend in the first direction;

a third slide block and a fourth slide block, which are in sliding connection to the third slide rail and the fourth slide rail, respectively;

a second connecting plate, which is connected to the third slide block, the fourth slide block and the second spiral transmission member; and at least one second positioning block, which is arranged on the second connecting plate, wherein a top of the second positioning block is provided with a second supporting portion, and the first supporting portion and the second supporting portion are configured to cooperate to fix the piece-to-be-transferred.

5. The transfer device according to claim 4, wherein in a second direction perpendicular to the first direction in the horizontal plane, a plurality of first connecting portions are arranged on the first connecting plate and the second connecting plate at intervals, bottoms of the first positioning block and the second positioning block are provided with second connecting portions, and the first connecting portions are in detachable connection to the second connecting portions.

6. The transfer device according to claim 5, wherein one of the first connecting portion and the second connecting portion is a positioning recess, the other one of the first connecting portion and the second connecting portion is a positioning column, and the positioning column is inserted into the positioning recess.

7. The transfer device according to claim 6, wherein an outer surface of the positioning column is provided with a snap-fit protrusion, an inner circumferential surface of the positioning recess is provided with a snap-fit groove, and when the positioning column is inserted into the positioning recess, the snap-fit protrusion is in snap-fit with the snap-fit groove.

8. The transfer device according to claim 4, wherein:

the first supporting portion comprises a first step structure, and the first step structure faces the second positioning block and is provided with a first step surface configured to support the piece-to-be-transferred; and the second supporting portion comprises a second step structure, and the second step structure faces the first positioning block and is provided with a second step surface configured to support the piece-to-be-transferred.

9. The transfer device according to claim 4, wherein two ends of the first connecting plate and two ends of the second connecting plate are all provided with first casters and second casters, and the first casters and the second casters are in rolling connection to the positioning platform.

10. The transfer device according to claim 1, wherein:

the positioning transmission mechanism further comprises a first limiting assembly, a second limiting assembly, and a second driving assembly connected to the first limiting assembly, wherein the first limiting assembly and the second limiting assembly are arranged on two opposite sides of the positioning platform at an interval in a second direction in the horizontal plane, and the second driving assembly is configured to drive the first limiting assembly to move in a direction toward or away from the second limiting assembly, such that the first limiting assembly and the second limiting assembly cooperate to clamp the piece-to-be-transferred; and the second direction is perpendicular to the first direction.

11. The transfer device according to claim 10, wherein the second driving assembly comprises:

a second driving member; and a second transmission assembly, which is connected to the second driving member and the first limiting assembly, wherein the second driving member is configured to drive the second transmission assembly to move, so as to drive the first limiting assembly to move in the direction toward or away from the second limiting assembly.

12. The transfer device according to claim 11, wherein the second transmission assembly comprises:

a second lead screw, which extends in the second direction; and a third spiral transmission member, which is in threaded connection to the second lead screw, and is connected to the first limiting assembly, wherein when the second driving member drives the second lead screw to rotate, the third spiral transmission member is adapted to reciprocate along the second lead screw, so as to drive the first limiting assembly to move in the direction toward or away from the second limiting assembly.

13. The transfer device according to claim 12, wherein the first limiting assembly comprises:

a fifth slide rail and a sixth slide rail, which are arranged on two sides of the second lead screw and extend in the second direction;

a fifth slide block and a sixth slide block, which are in sliding connection to the fifth slide rail and the sixth slide rail, respectively;

a third connecting plate, which is connected to the fifth slide block, the sixth slide block and the third spiral transmission member; and at least one first limiting block, which is arranged on the third connecting plate, and is configured to abut against the piece-to-be-transferred.

14. The transfer device according to claim 13, wherein the second limiting assembly comprises:

a fourth connecting plate, which is parallel to the third connecting plate, wherein the fourth connecting plate and the third connecting plate are arranged on the positioning platform at an interval; and at least one second limiting block, which is arranged on the fourth connecting plate, and is configured to abut against the piece-to-be-transferred.

15. The transfer device according to claim 1, wherein the supporting frame is provided with a positioning pin, the positioning platform is provided with a bearing guide sleeve matching the positioning pin, and the positioning pin is inserted into the bearing guide sleeve.

16. The transfer device according to claim 1, further comprising: a handlebar, which is arranged at one end of the positioning platform.

17. A transfer device, comprising:

an automated guided vehicle, which is provided with a supporting frame;

a positioning platform, which is arranged on the supporting frame; and a positioning transmission mechanism, which comprises a first locking assembly, a second locking assembly, and a first driving assembly connected to the first locking assembly and the second locking assembly, wherein the first locking assembly and the second locking assembly are arranged on two opposite sides of the positioning platform at an interval in a first direction in a horizontal plane;

wherein the positioning transmission mechanism further comprises a first limiting assembly, a second limiting assembly, and a second driving assembly connected to the first limiting assembly, the first limiting assembly and the second limiting assembly are arranged on two opposite sides of the positioning platform at an interval in a second direction in the horizontal plane, and the second direction is perpendicular to the first direction.

18. A transfer device, comprising:

an automated guided vehicle, which is provided with a supporting frame;

a positioning platform, which is arranged on the supporting frame; and a positioning transmission mechanism, which comprises a first locking assembly, a second locking assembly, and a first driving assembly connected to the first locking assembly and the second locking assembly, wherein the first locking assembly and the second locking assembly are arranged on two opposite sides of the positioning platform at an interval in a first direction in a horizontal plane;

wherein the supporting frame is provided with a positioning pin, the positioning platform is provided with a bearing guide sleeve matching the positioning pin, and the positioning pin is inserted into the bearing guide sleeve.

* * * * *